(12) United States Patent
Tan et al.

(10) Patent No.: US 12,613,824 B2
(45) Date of Patent: Apr. 28, 2026

(54) DATA PROCESSING APPARATUS AND METHOD

(71) Applicant: HUAWEI TECHNOLOGIES CO., LTD., Shenzhen (CN)

(72) Inventors: Zhufeng Tan, Shanghai (CN); Zongyan Li, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/894,211

(22) Filed: Aug. 24, 2022

(65) Prior Publication Data

US 2022/0405228 A1     Dec. 22, 2022

Related U.S. Application Data

(63) Continuation of application No. PCT/CN2020/077290, filed on Feb. 28, 2020.

(51) Int. Cl.
*G06F 13/40* (2006.01)
*G06F 9/48* (2006.01)

(52) U.S. Cl.
CPC .......... *G06F 13/4095* (2013.01); *G06F 9/485* (2013.01); *G06F 13/4068* (2013.01)

(58) Field of Classification Search
None
See application file for complete search history.

(56) References Cited

U.S. PATENT DOCUMENTS

| | | | |
|---|---|---|---|
| 9,065,722 B2 | 6/2015 | Thottethodi et al. | |
| 9,984,124 B2 * | 5/2018 | Dantressangle | G06F 16/24561 |
| 10,409,593 B2 * | 9/2019 | Kim | G06F 9/30101 |
| 2007/0273699 A1 * | 11/2007 | Sasaki | G06F 9/3879 |
| | | | 345/502 |
| 2011/0060924 A1 * | 3/2011 | Khodorkovsky | G06F 1/3203 |
| | | | 713/300 |
| 2011/0060928 A1 * | 3/2011 | Khodorkovsky | G06F 1/3287 |
| | | | 710/305 |
| 2017/0075858 A1 | 3/2017 | Yerli | |
| 2018/0284186 A1 | 10/2018 | Chadha et al. | |
| 2018/0373564 A1 * | 12/2018 | Hushchyn | G06F 9/5044 |

FOREIGN PATENT DOCUMENTS

| | | |
|---|---|---|
| CN | 106209121 A | 12/2016 |
| CN | 108734298 A | 11/2018 |
| CN | 109950227 A | 6/2019 |

* cited by examiner

*Primary Examiner* — Farley Abad
*Assistant Examiner* — Dayton Lewis-Taylor
(74) *Attorney, Agent, or Firm* — Rimon PC

(57) ABSTRACT

A data processing apparatus includes a first chip and a second chip that are stacked-packaged. The first chip includes a general-purpose processor, a bus, and at least one first dedicated processing unit (DPU). The general-purpose processor and the at least one first dedicated processing unit are connected to the bus. The general-purpose processor is configured to generate a data processing task. The second chip includes a second dedicated processing unit. At least one of one or more units in the at least one first dedicated processing unit and the second dedicated processing unit can process at least a part of the data processing task based on a computing function.

19 Claims, 8 Drawing Sheets

Data stream     Instruction stream     Control stream

| | |
|---|---|
| Generate a data processing task by using a general-purpose processor in a first chip | S301 |
| Process at least a part of the data processing task by using at least one of one or more first dedicated processing units in at least one first dedicated processing unit and a second dedicated processing unit in a second chip package | S302 |

DATA PROCESSING APPARATUS AND METHOD

CROSS-REFERENCE TO RELATED APPLICATIONS

This application is a continuation of International Application No. PCT/CN2020/077290 filed on Feb. 28, 2020, which is hereby incorporated by reference in its entirety.

TECHNICAL FIELD

This application relates to the field of chip technologies, and in particular, to a data processing apparatus and method.

BACKGROUND

System on chip (SOC) used in an intelligent terminal continuously evolves and develops as the semiconductor technology progresses, for example, process nodes in a semiconductor process evolved from 28 nm to 7 nm, or even 5 nm. The semiconductor process enables machine vision such as a camera algorithm and a neural network algorithm to be integrated into the SoC chip of an intelligent terminal, and it is required that the power consumption of the SoC chip of the intelligent terminal does not exceed the power supply capability and heat dissipation capability of a currently available battery.

However, as the Moore's Law growth rate slows down, the process evolution pace is extended, and the costs of each generation of process increase gradually. This brings great challenges to product competitiveness. Therefore, a conventional SoC integrated chip architecture gradually fails to meet a current requirement, and problems such as insufficient chip computing power, excessively high power consumption, and insufficient chip storage bandwidth mainly caused by a limited chip area became technical bottlenecks of the conventional SoC integrated chip architecture. In an existing chip stacking technology, an inter-chip stacking architecture is implemented by using through silicon via interconnection, and such technology may be used to separate and decouple components such as a storage component, an analog component, or an input/output I/O component from a main chip. In other words, the storage component, the analog component, or the input/output I/O component each is implemented as an independent chip. In this way, the main chip and the independent chip may use different manufacturing processes to achieve technology independence. In addition, a chip architecture does not significantly increase a product volume after being stacked. However, with rapid development of current Internet media and neural network algorithms, a user has higher audio and video requirements of an intelligent terminal, and the requirement for chip computing power, power consumption, and chip storage bandwidth of the SoC integrated chip of the intelligent terminal is also greatly increased. In an existing stacking solution, in a typical manner of extending a stacked memory for a chip, only the analog component and the input/output component are separated into independent chips. Therefore, the existing stacked chip architecture cannot meet an increasingly high computing requirement from users and cannot be applied to complex and changeable application scenarios. In addition, the power consumption performance of a chip architecture that is separated and then stacked is not optimized enough.

Therefore, how to provide an efficient chip structure to meet increasingly high power consumption and computing requirements without increasing a product volume, and to achieve the flexibility of task processing while improving product performance is an urgent problem to be resolved.

SUMMARY

Embodiments of this application provide a data processing apparatus and a related method, to improve product performance and achieve flexibility of task processing without increasing a product volume.

According to a first aspect, an embodiment of this application provides a data processing apparatus. The data processing apparatus may include a first chip and a second chip that are stacked-packaged. The first chip includes a general-purpose processor, a bus, and at least one first dedicated processing unit (DPU). The general-purpose processor and the at least one first dedicated processing unit are connected to the bus. The general-purpose processor is configured to generate a data processing task. The second chip includes a second dedicated processing unit. The second dedicated processing unit and one or more first dedicated processing units in the at least one first dedicated processing unit have an at least partially same computing function. At least one of the one or more first dedicated processing units and the second dedicated processing unit can process at least a part of the data processing task based on the computing function. The first chip and the second chip are connected to each other through an inter-chip interconnection.

According to the apparatus provided in the first aspect, after the general-purpose processor in the first chip generates the data processing task, because the second dedicated processing unit and the one or more first dedicated processing units in the at least one first dedicated processing unit have an at least partially same computing function, the second dedicated processing unit may process at least a part of the data processing task based on the at least partially same computing function. Therefore, the data processing apparatus may flexibly allocate data processing tasks to the first dedicated processing unit and the second dedicated processing unit based on a data task requirement, to meet a computing requirement of a user. For example, when a data processing task volume is small, the data processing tasks may be allocated to the first dedicated processing unit alone. Alternatively, the data processing tasks may be allocated to the second dedicated processing unit alone. For another example, when a data processing task volume is large, the data processing tasks may be allocated to both of the first dedicated processing unit and the second dedicated processing unit. In addition, in the stacked chip architecture of the data processing apparatus, the second dedicated processing unit may assist the first dedicated processing unit in processing a data processing task without significantly increasing an overall chip volume, to enhance computing power of the first dedicated processing unit. This greatly alleviates the demand to enhance the computing power of a chip and at the same time satisfies the requirement of enhanced computing power of a chip due to rapid development of current algorithms, and also avoids a scenario in which a chip cannot complete a data processing task because the computing power of the first dedicated processing unit is insufficient. Therefore, the data processing apparatus can meet increasingly high power consumption and computing requirements of a user without increasing the product volume, improve product performance, and meet flexibility of task processing.

In a possible implementation, the second dedicated processing unit and the one or more first dedicated processing units in the at least one first dedicated processing unit have a same computing function. In this embodiment of this application, the second dedicated processing unit and the one or more first dedicated processing units in the at least one first dedicated processing unit have the same computing function. Therefore, the second dedicated processing unit and the one or more first dedicated processing units may process a same data processing task. For example, when the one or more first dedicated processing units cannot execute a data processing task promptly, the second dedicated processing unit may assist the one or more first dedicated processing units in executing the data processing task, to meet an increasingly high computing requirement of a user.

In a possible implementation, the general-purpose processor includes a central processing unit (CPU). In an implementation of this embodiment of this application, the general-purpose processor in the first chip may be the central processing unit, and may be used as an operation and control core of a chip system to generate a data processing task. The general-purpose processor is also a final execution unit for information processing and program running, to meet a basic computing requirement of a user.

In a possible implementation, each of the one or more first dedicated processing units and the second dedicated processing unit includes at least one of a graphics processing unit (GPU), an image signal processor (ISP), a digital signal processor (DSP), or a neural network processing unit (NPU). In an implementation of this embodiment of this application, the one or more first dedicated processing units and the second dedicated processing unit may be separately configured to execute data processing tasks of different data types, so that an intelligent terminal can adapt to more different types of data processing requirements of a user.

In a possible implementation, the inter-chip interconnection includes at least one of a through silicon via (TSV) interconnection and a wire bonding interconnection. In an implementation of some embodiments of this application, a plurality of high efficient inter-chip interconnections may be used as the inter-chip interconnection, for example, the through silicon via (TSV) interconnection or the wire bonding interconnection. For example, as an inter-chip through via interconnection technology, a TSV has a small via diameter, a low delay, and flexible configuration of inter-chip data bandwidth, so that the overall computing efficiency of a chip system is improved. A protrusion-free bonding structure is further implemented by using a TSV through silicon via technology, so that adjacent chips of different properties are integrated. The wire bonding interconnection is used to stack chips to reduce a length of the inter-chip interconnection and improve working efficiency of the chip.

In a possible implementation, the apparatus further includes a third chip, the third chip is stacked-packaged with the first chip and the second chip, and the third chip is connected to at least one of the first chip or the second chip through the inter-chip interconnection; and the third chip includes at least one of a memory, a power transmission circuit module, an input/output circuit module, or an analog module. In this embodiment of this application, the first chip may be stacked-packaged with the third chip. For example, the memory and the first chip are stacked. In this way, the problem of insufficient storage bandwidth is partially resolved, and the computing power of the chip is enhanced. One or more of the power transmission circuit module, the input/output circuit module, or the analog module may be stacked with the first chip. This can separate and decouple an analog function and a logical computing function of the SoC chip while increasing the computing power of the chip.

Therefore, the increasing high requirement for the chip in chip evolution and service scenarios continues to be met.

In a possible implementation, the inter-chip interconnection is connected between the one or more first dedicated processing units and the second dedicated processing unit, and the second dedicated processing unit is configured to obtain at least a part of the data processing task from the one or more first dedicated processing units. In an implementation of this embodiment of this application, the second chip is connected to the one or more first dedicated processing units in the first chip, and may obtain at least a part of the data processing task from the one or more first dedicated processing units. Therefore, the second dedicated processing unit may be scheduled by the one or more first dedicated processing units to execute at least a part of the data processing task. Therefore, flexibility of task processing can be achieved.

In a possible implementation, the inter-chip interconnection is connected between the second dedicated processing unit and the bus, and the second dedicated processing unit is configured to obtain at least a part of the data processing task from the general-purpose processor through the bus. In an implementation of some embodiments of this application, the second chip is connected to the bus in the first chip to obtain at least a part of the data processing task from the general-purpose processor. Therefore, the second dedicated processing unit may be scheduled by the general-purpose processor to execute at least a part of the data processing task alone, or to jointly execute at least a part of the data processing task with one or more first dedicated processing units. Therefore, flexibility of task processing can be achieved.

In a possible implementation, the general-purpose processor is configured to send start information to the second dedicated processing unit through the inter-chip interconnection. The second dedicated processing unit is configured to: switch from a standby state to a working state in response to the start information, and process at least a part of the data processing task based on the computing function. In an implementation of some embodiments of this application, the general-purpose processor may adjust the computing power of the second dedicated processing unit. For example, when the general-purpose processor in the first chip sends the start information to the second dedicated processing unit through the inter-chip interconnection, the second chip may switch from the standby state to the working state to execute a data processing task. Power consumption of the second chip being in the standby state is lower than power consumption of the second chip being in the working state. Therefore, when the general-purpose processor does not send the start information to the second dedicated processing unit, the second dedicated processing unit is always in the standby state, so that the power consumption of the stacked chips is effectively controlled.

In a possible implementation, the general-purpose processor is configured to: when the computing power of the one or more first dedicated processing units does not meet certain requirement, send the start information to the second dedicated processing unit through the inter-chip interconnection. In an implementation of this application, when one or more first dedicated processing units in the first chip execute a data processing task and the computing power of the one or more first dedicated processing units is insufficient, the second chip in the stacked chips may receive the start information sent by the general-purpose processor, switch from a standby state to a working state based on the start information, and assist the one or more first dedicated processing units in the first chip in executing the data processing task. This can enhance or supplement the computing power of the one or more first dedicated processing units, and avoid the scenario in which the chip cannot complete a data processing task of target data because the computing power of the one or more first dedicated processing units is insufficient. Therefore, when the computing power of the one or more first dedicated processing units meets the computing requirement, the second chip may remain in the standby state, and the second chip does not need to switch to the working state, and the dedicated processing units alone in the first chip are enabled to execute a data processing task. Therefore, overall power consumption of the chip is reduced.

In a possible implementation, the one or more first dedicated processing units are configured to send start information to the second dedicated processing unit through the inter-chip interconnection. The second dedicated processing unit is configured to: switch from a standby state to a working state in response to the start information, and process at least a part of the data processing task based on the computing function. In an implementation of this embodiment of this application, the one or more first dedicated processing units may adjust computing power of the second dedicated processing unit. For example, when the one or more first dedicated processing units of the general-purpose processor in the first chip send the start information to the second dedicated processing unit through the inter-chip interconnection, the second chip may switch from the standby state to the working state to execute a data processing task. Power consumption of the second chip being in the standby state is lower than power consumption of the second chip being in the working state. Therefore, when the one or more first dedicated processing units do not send the start information to the second dedicated processing unit, the second dedicated processing unit stays in the standby state, so that power consumption of the stacked chips is effectively controlled.

In a possible implementation, the one or more first dedicated processing units are configured to: when computing power of the one or more first dedicated processing units does not meet a requirement, send start information to the second dedicated processing unit through the inter-chip interconnection. In an implementation of this application, when one or more first dedicated processing units in the first chip execute a data processing task and computing power of the one or more first dedicated processing units is insufficient, the second chip in the stacked chips may receive the start information sent by the one or more first dedicated processing units, switch from a standby state to a working state based on the start information, and assist the one or more first dedicated processing units in the first chip in executing the data processing task. This can enhance or supplement the computing power of the one or more first dedicated processing units, and avoid a case in which the chip cannot complete a data processing task of target data because the computing power of the one or more first dedicated processing units is insufficient. Therefore, a computing requirement of a user is met. Therefore, when the computing power of the one or more first dedicated processing units meets the computing requirement, the second chip may stay in the standby state, and the second chip does not need to be switched to the working state, and the dedicated processing units alone in the first chip are enabled to execute a data processing task. Therefore, overall power consumption of the chip is reduced.

According to a second aspect, an embodiment of this application provides a data processing method, including: generating a data processing task by using a general-purpose processor in a first chip, where the first chip includes the general-purpose processor, a bus, and at least one first dedicated processing unit (DPU), and the general-purpose processor and the at least one first dedicated processing unit are connected to the bus; and processing at least a part of the data processing task by using at least one of one or more first dedicated processing units in the at least one first dedicated processing unit and a second dedicated processing unit in a second chip package, where the second dedicated processing unit and the one or more first dedicated processing units in the at least one first dedicated processing unit have an at least partially same computing function, and the first chip and the second chip are stacked-packaged, and are connected to each other through an inter-chip interconnection.

In a possible implementation, the processing at least a part of the data processing task by using at least one of one or more first dedicated processing units in the at least one first dedicated processing unit and a second dedicated processing unit in a second chip package includes: sending, by using the general-purpose processor, start information to the second dedicated processing unit through the inter-chip interconnection; and switching, by using the second dedicated processing unit in response to the start information, from a standby state to a working state, and processing the at least a part of the data processing task based on the computing function.

In a possible implementation, the sending start information to the second dedicated processing unit by using the general-purpose processor through the inter-chip interconnection includes: when computing power of the one or more first dedicated processing units does not meet a requirement, sending, by using the general-purpose processor, the start information to the second dedicated processing unit through the inter-chip interconnection.

In a possible implementation, the processing at least a part of the data processing task by using at least one of one or more first dedicated processing units in the at least one first dedicated processing unit and a second dedicated processing unit in a second chip package includes: sending, by using the one or more first dedicated processing units, start information to the second dedicated processing unit through the inter-chip interconnection. The second dedicated processing unit is configured to: switch from a standby state to a working state in response to the start information, and process at least a part of the data processing task based on the computing function.

In a possible implementation, the sending start information to the second dedicated processing unit by using the one or more first dedicated processing units through the inter-chip interconnection includes: when computing power of the one or more first dedicated processing units does not meet a requirement, sending, by using the one or more first dedicated processing units, the start information to the second dedicated processing unit through the inter-chip interconnection.

According to a third aspect, an embodiment of this application provides a chip system. The chip system includes any apparatus configured to support data processing in the first aspect.

The chip system may include a chip, or may include a chip and other components.

BRIEF DESCRIPTION OF DRAWINGS

To describe technical solutions in embodiments of this application more clearly, the following describes the accompanying drawings used in embodiments in this application.

DESCRIPTION OF EMBODIMENTS

Figure 1:
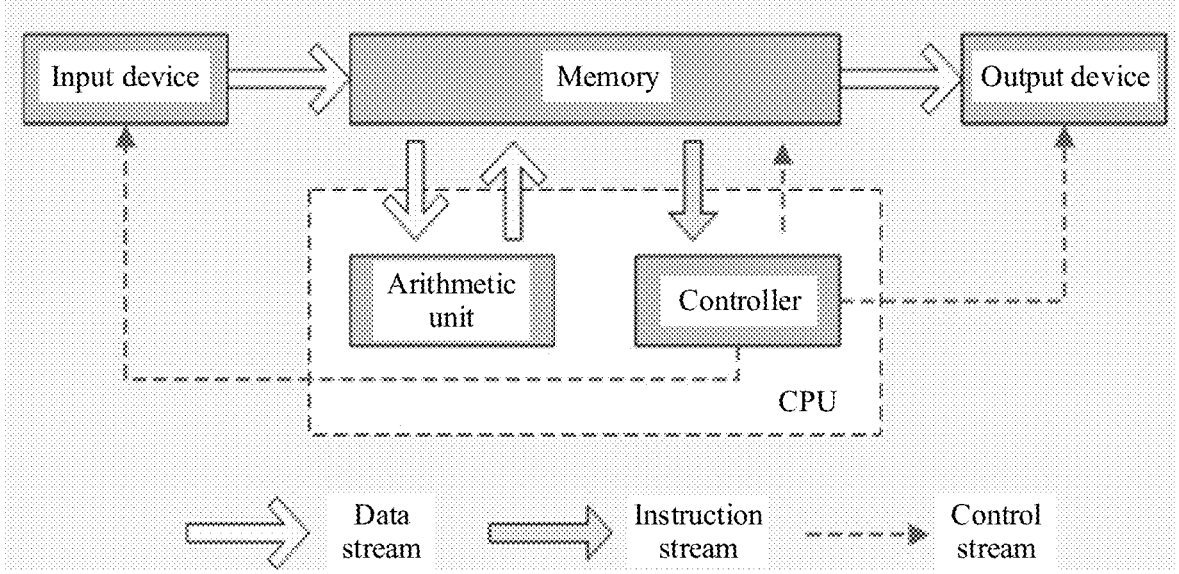
FIG. 1 is a schematic diagram of a conventional Von Neumann chip architecture according to an embodiment of this application.

The following describes embodiments of this application with reference to the accompanying drawings in embodiments of this application.

In the specification, claims, and accompanying drawings of this application, the terms such as "first", "second", "third", and "fourth", and the like are intended to distinguish between different objects but do not indicate a particular order. In addition, the terms "including", "having" and any other variants thereof are intended to cover non-exclusive inclusion. For example, a process, method, system, product, or device that includes a series of steps or units is not limited to the listed steps or units, but optionally further includes steps or units that are not listed. Alternatively, other steps or units inherent to the process, method, product, or device are optionally further included.

"Embodiment" mentioned in this specification means that a particular feature, structure, or characteristic described with reference to the embodiment may be included in at least one embodiment according to this application. The phrase appearing at various locations in this specification does not necessarily refer to a same embodiment, and is not an independent or alternative embodiment mutually exclusive to another embodiment. It is explicitly and implicitly understood by a person skilled in the art that embodiments described in the specification may be combined with another embodiment.

The terms such as "component", "module", and "system" used in this specification indicate computer-related entities, hardware, firmware, combinations of hardware and software, software, or software being executed. For example, a component may be, but is not limited to, a process that runs on a processor, a processor, an object, an executable file, an execution thread, a program, and/or a computer. As illustrated by using figures, both of a computing device and an application that runs on the computing device may be components. One or more components may reside within a process and/or an execution thread, and a component may be located on one computer and/or distributed between two or more computers. In addition, these components may be executed from various computer-readable media that store various data structures. The components may communicate by using a local and/or remote process and based on, for example, a signal having one or more data packets (for example, data from two components interacting with another component in a local system, a distributed system, and/or across a network such as the Internet interacting with other systems by using the signal).

"Connection" in this embodiment refers to communication, data exchange, energy transmission, and the like that can be performed between connected modules, units, or components. The connection may be a direct connection, or may be an indirect connection performed by using another component or module. For example, the connection may be performed by using some conducting wires, conductors, media, interfaces, apparatuses, or units, because the connection may be considered as an electrical connection or coupling in a broad sense.

First, some terms in this application are described to help a person skilled in the art have a better understanding.

(1) A through silicon via (TSV) is a vertical interconnection structure that penetrates a silicon wafer or a chip. The TSV may be used to implement 3D integrated circuit (IC) packaging, and complies with the Moore's Law For example, the TSV can stack a plurality of chips, and a design concept of the TSV comes from a printed circuit board (PCB). Specifically, a small hole is drilled on a chip (a process may be further divided into two types: via first and via last), and a metal is filled from a bottom of the small hole. For example, a via is drilled in an etching or laser manner on a silicon wafer that forms a chip, and then the via is filled with a conductive material such as copper, polycrystalline silicon, or tungsten. This technology can effectively improve integration and efficiency of a system with lower costs.

(2) A system on chip (SOC), also referred to as a system-on-a-chip, is an integrated circuit with a dedicated target use. The system on chip includes a circuit system with complete functions and all content of embedded software. The SoC includes a plurality of different functional components, which are described in the following.

(3) A stacked structure refers to a type of system-in-package. There are three types of system-in-package: an adjacent structure, a stacked structure, and a buried structure. The stacked structure may be used to increase package density in a three-dimensional direction, and may be applied to packaging of different tiers or levels, for example, package on package (PoP), package in package (PiP), stacking of chips or dies, and stacking of chips and wafers. Stacked-package chips are commonly used in various terminal products. An advantage of the stacked structure lies in that a standard chip and a wire can be first bonded and subsequently packaged by using an existing device and process. However, the stacked structure limits the thickness of an entire package body, and the thickness of the entire package body cannot be excessively large. Currently, up to eight dies can be vertically mounted in one package body, and the thickness of the eight dies is less than 1.2 mm. Therefore, this requires that each die in the stacked-package chips has a thin wafer, a thin substrate, a low lead radian, a low mold cover height, or the like.

(4) A wafer is a silicon slice used for manufacturing a silicon semiconductor integrated circuit, and is also referred to as a wafer because a shape of the wafer is a circle.

(5) A die is an integrated circuit product that includes various circuit component structures and has specific electrical functions after being processed and cut on a wafer. The die may be manufactured into a chip after being packaged.

(6) A graphics processing unit (GPU), also referred to as a display core, a visual processor, or a display chip, is a microprocessor that performs image and graphics-related operations on a personal computer, a workstation, a game machine, and some mobile devices (such as a tablet computer and a smartphone). The GPU enables a device to be less dependent on the CPU and performs a part of work that originally belongs to the CPU. Especially in 3D graphics processing, core technologies used by the GPU include hardware geometrical conversion and illumination processing (T and L), cube environment material textures and vertex blending, texture compression and bump mapping, and a dual-texture 4-pixel 256-bit rendering engine. The hardware geometrical conversion and illumination processing technology is a symbol of the GPU.

(7) A digital signal processor (DSP) usually refers to a chip or a processor that executes a digital signal processing technology. The digital signal processing technology is a technology that converts analog information (such as sound, video, and pictures) into digital information, and the digital signal processor may also be used to process the analog information and output the analog information as analog information. The digital signal processing technology studies a digital signal processing algorithm and an implementation method thereof, based on digital signal processing theory, hardware technology, and software technology.

(8) A neural network processing unit (NPU) is a processor for processing a neural model, and may be considered as a component (or a subsystem), or may be referred to as an NPU-coprocessor. The neural network processing unit uses a "data-driven parallel computing" architecture and is capable of processing massive video and image multimedia data.

(9) A printed circuit board (PCB) is a provider of electrical connections for electronic components. Based on a quantity of layers of circuit boards, printed circuit boards can be classified into single-sided boards, double-sided boards, four-layer boards, six-layer boards, and other multilayer circuit boards.

(10) A static random access memory (SRAM) is a type of random access memory. "Static" means that provided that the SRAM is kept powered on, data stored in the SRAM can be constantly stored. In contrast, data stored in a dynamic random access memory (DRAM) needs to be updated periodically. However, when power supply is stopped, the data stored in the SRAM still disappears (SRAM is referred to as volatile memory), which is different from a ROM or flash memory that can still store data after the power supply is stopped.

(11) Input/Output (I/O) usually refers to input data and output data between an internal device and an external memory or another peripheral device, and is communication between an information processing system (for example, a computer) of the internal device and an outside world (which may be a human or another information processing system). Inputs are signals or data received by the system, and outputs are signals or data sent from the system. The term can also be used as a part of an action. To "perform I/O" is to perform an input or output operation.

(12) A Von Neumann structure, also known as a Princeton structure, is a memory structure that combines a program instruction memory and a data memory. A program instruction memory address and a data memory address point to different physical locations of a same memory. Therefore, the widths of program instructions and data are the same.

(13) An arithmetic logic unit is a smallest unit of an arithmetic unit in a CPU, and is a hardware structure. Currently, a computing operation is completed by using a logic circuit formed by a tiny component such as an electronic circuit, and a high/low level signal, namely, a binary signal, is processed.

FIG. 1 is a schematic diagram of a conventional Von Neumann chip architecture according to an embodiment of this application. As shown in FIG. 1, the chip includes an arithmetic unit, a controller, a memory, an input device, and an output device.

The conventional Von Neumann chip architecture cannot meet a current requirement on chip computing power, power consumption, and chip memory bandwidth. Therefore, a chip stacking technology may be used to resolve some problems such as insufficient chip computing power, excessively high power consumption, and insufficient chip memory bandwidth that are caused by a limited chip area. In the chip stacking technology (an example of which is an SoC chip of a mobile intelligent terminal is used), a power transmission circuit, an I/O circuit module, a radio frequency circuit module, or the like in the SoC chip may be separately split into another chip, so that circuits with different functions are decoupled. In embodiments of this application, an input/output (I/O) module or a dedicated processing unit may be further decoupled from a main chip and used as an independent chip. In this way, the main chip no longer has functions of the independent chip that is decoupled from the main chip, and the main chip and the independent chip both need to work at the same time. Consequently, the power consumption performance is not optimized.

Figure 2A:
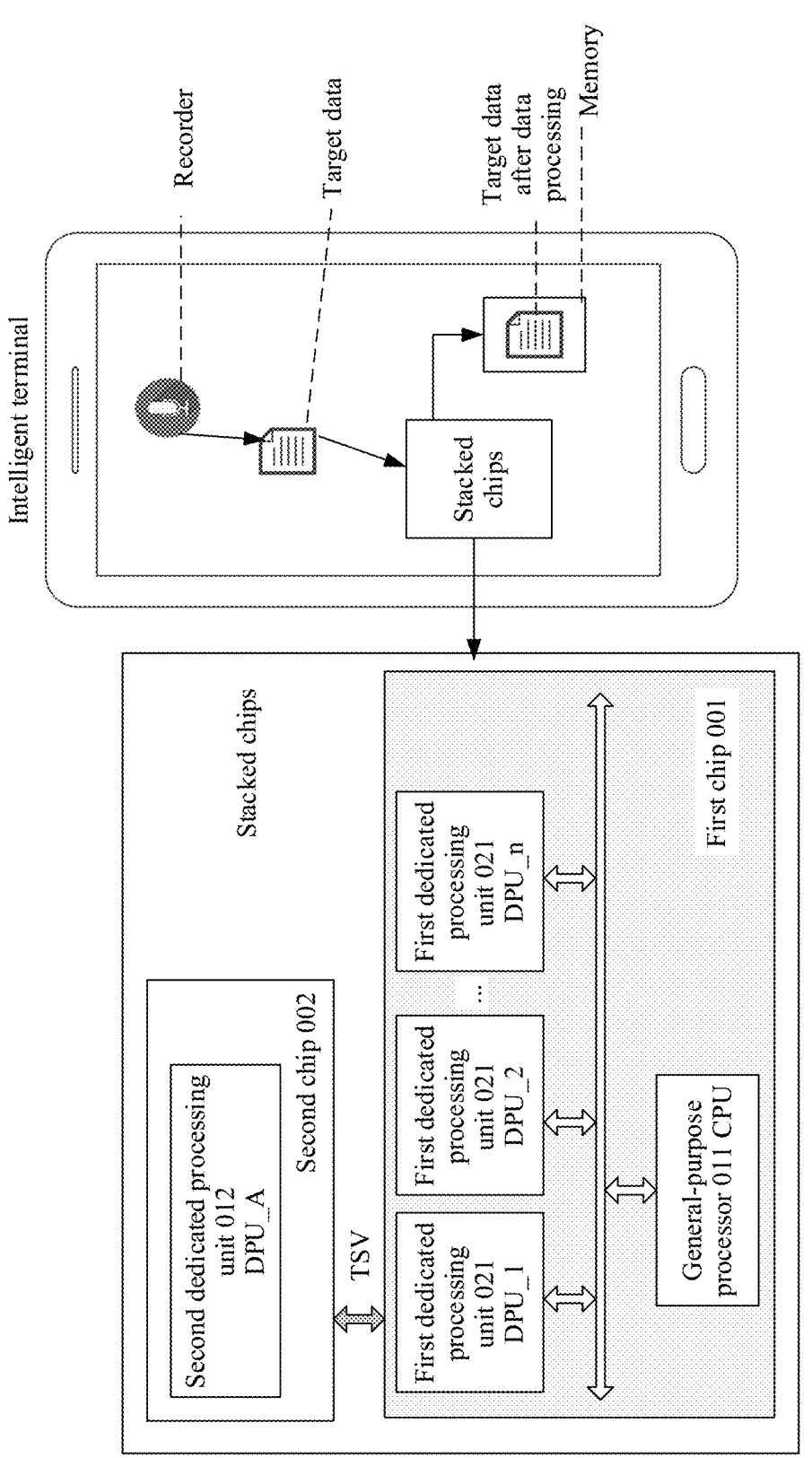
FIG. 2A is a schematic diagram of a data processing architecture according to an embodiment of this application.

In view of the foregoing analysis, a data processing apparatus provided in this application can enhance computing power of data processing of a chip, reduce overall power consumption of the chip, and reduce a product size. To facilitate understanding of the embodiments of this application, the following first describes an architecture of a data processing apparatus on which embodiments of this application are based. FIG. 2A is a schematic diagram of a data processing architecture according to an embodiment of this application. The architecture shown in FIG. 2A is described from a perspective of data processing using stacked chips as a main body.

It should be noted that, in a broad sense, a chip may be a packaged chip, or a chip that is not packaged, namely, a die. All chips in a chip structure used for stacking and packaging, such as a "first chip", a "second chip", and a "main chip", in this application may be understood as chips that are not packaged. In other words, these chips are dies. A die is an integrated circuit product that includes various circuit component structures on a cut silicon wafer and that has a specific electrical function. Therefore, all chips that need to be stacked-packaged in embodiments of this application are dies that have not been packaged.

As shown in FIG. 2A, when a user finishes using a recording function of an intelligent terminal, the intelligent terminal may perform data processing on a recorded audio file by using stacked chips, and then store data of the processed audio file in a memory. A stacked chip system in the intelligent terminal includes a first chip 001 and a second chip 002. The first chip 001 may be a system on chip SoC. The first chip 001 includes a general-purpose processor 011, a bus 00, and at least one first dedicated processing unit (DPU) 021. The general-purpose processor 011 and the at least one first dedicated processing unit 021 are connected to the bus. The at least one first dedicated processing unit 021 may be sequentially denoted as a DPU_1 to a DPU_n. The second chip 002 includes a second dedicated processing unit 012 (which may be denoted as a DPU_A), and the first chip 001 is connected to the second chip 002 through an inter-chip interconnection.

The first chip 001 is configured to process data and generate a data processing task, and may further send start information to the second chip 002. The second chip 002 is configured to: switch from a standby state to a working state when receiving the start information, and execute a part of or all of the data processing task by using the second dedicated processing unit.

The general-purpose processor 011 (for example, a central processing unit (CPU)) in the first chip 001 is used as an operation and control core of the chip system, and is a final execution unit for information processing and program running. In the field of mobile terminals, the general-purpose processor 011 may generally include an advance reduced instruction set computing machine (Advanced RISC Machines (ARM)) series, and may include one or more core processing units. In this embodiment of this application, the general-purpose processor 011 may be configured to generate a data processing task of target data. Optionally, the general-purpose processor 011 may further select one or more first dedicated processing units 021 in the at least one first dedicated processing unit 021 to perform at least a part of the data processing task based on the data processing task. Optionally, the general-purpose processor 011 may be further configured to process a simple data processing task without assistance of the at least one first dedicated processing unit 021 and the second dedicated processing unit 012.

At least one first dedicated processing unit 021 in the first chip 001 may process at least a part of the data processing task based on a computing function. For example, a graphics processing unit (GPU) may execute a data processing task of image recognition. Optionally, the at least one first dedicated processing unit 021 may include at least one of a graphics processing unit (GPU), an image signal processor (ISP), a digital signal processor (DSP), or a neural network processing unit (NPU). Optionally, all of first dedicated processing units (DPU) in the at least one first dedicated processing unit 021 may work at the same time. Alternatively, one first dedicated processing unit (DPU) in the at least one first dedicated processing unit 021 may work alone.

The bus 00 in the first chip 001 is also referred to as an internal bus, a board-level bus, or a microcomputer bus. The bus 00 may be configured to connect functional components in the chip to form a complete chip system, and may be further configured to transmit various data signals, control commands, and the like, to assist communication between the functional components. For example, the general-purpose processor 011 may be connected to at least one first dedicated processing unit 021, so that the general-purpose processor 011 may control one or more first dedicated processing units 021 in the at least one first dedicated processing unit 021 to execute a data processing task.

The second dedicated processing unit 012 in the second chip 002 and one or more first dedicated processing units 021 in the at least one first dedicated processing unit 021 have an at least partially same computing function, and at least one of the one or more first dedicated processing units 021 and the second dedicated processing unit 012 can process at least a part of the data processing task based on the computing function. That the second dedicated processing unit 012 and the one or more first dedicated processing units 021 have an at least partially same computing function may indicate that a computing function of the second dedicated processing unit 012 may be at least partially the same as a computing function of the one or more first dedicated processing units 021. The partially same computing function is a common function of the second dedicated processing unit 012 and the one or more first dedicated processing units 021, and the common function may be used to perform computing on the data processing task. The data processing task may be allocated to the second dedicated processing unit 012 and the one or more first dedicated processing units 021 for processing. For example, the second dedicated processing unit 012 and the one or more first dedicated processing units 021 share computing power. This is described in detail subsequently. Certainly, computing functions of the second dedicated processing unit 012 and the one or more first dedicated processing units 021 may be the same. For example, the second dedicated processing unit 012 and the one or more first dedicated processing units 021 may execute a same data processing task by using arithmetic logic, arithmetic manners, and/or arithmetic objectives that are partially same. For example, the one or more first dedicated processing units 021 may have a convolutional neural network operation capability, and the second dedicated processing unit 012 may also have at least a part of the convolutional neural network operation capability. For example, the second dedicated processing unit 012 may include most of the convolutional neural network operation capability. For another example, in a neural computing operation, the one or more first dedicated processing units 021 may convert a segment of speech into several keywords by using a speech recognition method, and the second dedicated processing unit 012 may convert a segment of speech into a string of characters including keywords by using the speech recognition method. For another example, the one or more first dedicated processing units 021 may have an image operation processing capability of an ISP to generate a photographed image, for example, the capability may include white balance, noise reduction, pixel calibration, image sharpening, and Gamma correction. The second dedicated processing unit 012 may also have most of the image operation processing capability of the previous ISP, to generate a photographed image. For example, the capability may include white balance, noise reduction, pixel calibration, or image sharpening.

Optionally, the second dedicated processing unit 012 in the second chip 002 and one or more first dedicated processing units 021 in the at least one first dedicated processing unit 021 have a same computing function, and the second dedicated processing unit 012 in the second chip 002 may be configured to execute all of the obtained data processing task. That the second dedicated processing unit 012 and the one or more first dedicated processing units 021 may have a same computing function may include: The second dedicated processing unit 012 and the one or more first dedicated processing units 021 may have a same arithmetic logic and/or arithmetic manner, to execute a data processing task. For example, when one first dedicated processing unit 021 in the at least one first dedicated processing unit 021 includes a unit of a parallel matrix computing array, the second dedicated processing unit 012 may also include a unit configured to implement the parallel matrix computing array, and an algorithm type used by the second dedicated processing unit 012 may also be consistent with an algorithm type used by the first dedicated processing unit 021.

The inter-chip interconnection includes any one of a through silicon via (TSV) interconnection and a wire bonding interconnection. For example, as an inter-chip through via interconnection technology, a TSV has a small via diameter, a low delay, and flexible configuration of inter-chip data bandwidth, so that overall computing efficiency of a chip system is improved. A protrusion-free bonding structure is further implemented by using a TSV through silicon via technology, so that adjacent chips of different properties are integrated. The wire bonding interconnection is used to stack chips to reduce a length of the inter-chip interconnection and improve working efficiency of the chip.

It should be noted that a connection signal of the inter-chip interconnection may include a data signal and a control signal. The digital signal may be used to transmit the target data, and the control signal may be used to allocate a data processing task of the target data. This is not specifically limited in this application.

It should be further noted that the data processing architecture in FIG. 2A is merely an example implementation in embodiments of this application, and the data processing architecture inembodiments of this application includes but is not limited to the foregoing data processing architecture. For example, the first chip 001 may further be stacked with a plurality of second chips 002 to form one chip, and second dedicated processing units included in the plurality of second chips 002 and at least one first dedicated processing unit 021 included in the first chip 001 have an at least partially same computing function.

It should be further noted that the stacked chip system may be configured in different data processing apparatuses, and correspond to different forms of main control in the different data processing apparatuses. A form of the main control is not limited in this embodiment of this application, for example, a server notebook computer, a smartphone, or a vehicle-mounted television.

Figure 2B:
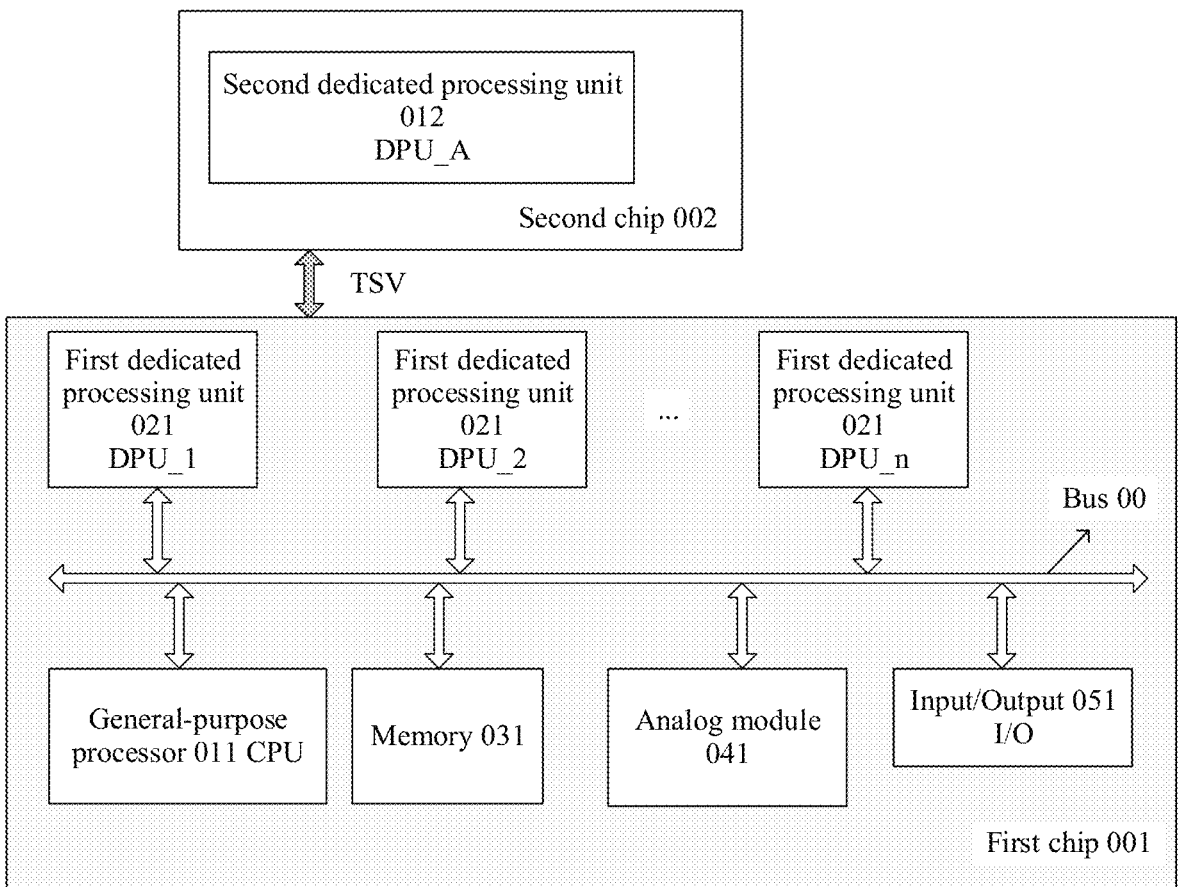
FIG. 2B is a schematic diagram of a stacked-package chip architecture according to an embodiment of this application.

Second, based on the data processing architecture provided in FIG. 2A, embodiments of this application describe two chip stacking architectures in the data processing apparatus architecture. FIG. 2B is a schematic diagram of a stacked-package chip architecture according to an embodiment of this application. In the stacked-package chip architecture shown in FIG. 2B, a first chip and a second chip are connected to each other through an inter-chip interconnection. The architecture is described from a perspective of data processing using an SoC chip as a main chip.

The chip architecture shown in FIG. 2B includes a first chip 001 and a second chip 002. The first chip 001 includes a general-purpose processor 011 (for example, a CPU, or optionally a microcontroller), at least one first dedicated processing unit 021 (DPU_1, DPU_2, ..., and DPU_n), and a bus 00. The chip architecture further includes a memory 031, an analog module 041, an input/output module 051, and the like. The second chip 002 is a computing power stacking chip connected to the first dedicated processing unit DPU_1, and the second chip 002 includes the second dedicated processing unit 012 (namely, the DPU_A).

The general-purpose processor 011 in the first chip 001 may be a CPU, and is configured to generate a data processing task.

Optionally, the general-purpose processor 011 in the first chip 001 is further configured to allocate a data processing task to one or more first dedicated processing units in the at least one first dedicated processing unit 021, and/or the second dedicated processing unit 012 in the second chip. The general-purpose processor 011 in the first chip 001 may flexibly allocate data processing tasks to the first dedicated processing unit and the second dedicated processing unit based on a data task requirement, to meet an increasingly high computing requirement of a user. For example, when a data processing task volume is small, the data processing tasks may be allocated to the first dedicated processing unit alone. For another example, when a data processing task volume is large, the data processing tasks may be allocated to both of the first dedicated processing unit and the second dedicated processing unit. Alternatively, the data processing tasks may be allocated to the second dedicated processing unit alone. In this way, the flexibility of task processing is achieved without increasing the product volume/size.

Optionally, the inter-chip interconnection is connected between the second dedicated processing unit and the bus, and the general-purpose processor 011 in the first chip 001 may be further configured to send start information to the second dedicated processing unit through the inter-chip interconnection, so that the second dedicated processing unit switches from a standby state to a working state in response to the start information and processes at least a part of the data processing task based on a computing function of the second dedicated processing unit. In this case, power consumption of the second dedicated processing unit being in the standby state is lower than power consumption of the second dedicated processing unit being in the working state. Therefore, when the general-purpose processor does not send the start information to the second dedicated processing unit, the second dedicated processing unit remains in the standby state, so that power consumption of the stacked chips is effectively controlled.

Optionally, the inter-chip interconnection is connected between the second dedicated processing unit and the bus, and the general-purpose processor 011 in the first chip 001 may be further configured to: when computing power of the one or more first dedicated processing units does not meet a requirement, send start information to the second dedicated processing unit through the inter-chip interconnection. When one or more first dedicated processing units 021 in the first chip execute a data processing task, and computing power of the one or more first dedicated processing units 021 is insufficient, the second chip 002 in the stacked chips may receive start information sent by the general-purpose processor 011, switch from a standby state to a working state based on the start information, and assist the one or more first dedicated processing units 021 in the first chip 001 in executing the data processing task. This can enhance or supplement the computing power of the one or more first dedicated processing units 021, and avoid the scenario in which the chip cannot complete a data processing task of target data because the computing power of the one or more first dedicated processing units 021 is insufficient.

It should be noted that, whether the one or more first dedicated processing units 021 can complete execution of the data processing task within a preset time is predicted based on the computing power of the one or more first dedicated processing units 021. If the one or more first dedicated processing units 021 cannot complete the execution of the data processing task within the preset time, it is determined that the computing power of the one or more first dedicated processing units 021 is insufficient when the one or more first dedicated processing units 021 execute the data processing task.

At least one first dedicated processing unit 021 in the first chip 001 is sequentially denoted as a DPU_1, a DPU_2, ..., and a DPU_n from left to right. One or more first dedicated processing units 021 in the at least one first dedicated processing unit 021 are configured to obtain and execute a data processing task based on a corresponding computing function.

Optionally, the at least one first dedicated processing unit 021 may include one or more of a graphics processing unit (GPU), an image signal processor (ISP), a digital signal processor (DSP), or a neural network processing unit (NPU). For example, the GPU and the ISP may be configured to process graphics data in an intelligent terminal. The DSP may be configured to process digital signal data in the intelligent terminal. The NPU may be configured to process massive video and image multimedia data in the intelligent terminal. Therefore, the at least one first dedicated processing unit 021 may be configured to execute different data processing tasks by using different computing functions, so that the intelligent terminal can adapt to more data processing requirements of a user. The DPU_1 in the first chip 001 in this embodiment of this application is configured to execute a data processing task.

Optionally, the inter-chip interconnection is connected between the one or more first dedicated processing units and the second dedicated processing unit. The one or more first dedicated processing units 021 in the first chip 001 are further configured to: when executing the data processing task, send start information to the second chip 002, and allocate a part or all of the processing task to the second dedicated processing unit 012 in the second chip 002. In this way, the second dedicated processing unit 012 switches from a standby state to a working state in response to the start information, and processes at least a part of the data processing task based on a computing function that is at least partially same as that of the one or more first dedicated processing units 021. In this case, power consumption of the second dedicated processing unit 012 being in the standby state is lower than power consumption of the second dedicated processing unit 012 being in the working state. Therefore, when the one or more first dedicated processing units 021 do not send the start information to the second dedicated processing unit 012, the second dedicated processing unit 012 remains in the standby state, so that the power consumption of the stacked chips is effectively controlled. It should be noted that the power consumption of the second dedicated processing unit 012 being in the standby state is lower than the power consumption of the second dedicated processing unit 012 being in the working state.

Optionally, the inter-chip interconnection is connected between the one or more first dedicated processing units and the second dedicated processing unit. The one or more first dedicated processing units 021 in the first chip 001 are configured to: when computing power of the one or more first dedicated processing units 021 does not meet a requirement, send start information to the second dedicated processing unit 012 through the inter-chip interconnection. When one or more first dedicated processing units 021 in the first chip 001 execute a data processing task, and the computing power of the one or more first dedicated processing units 021 is insufficient, the second chip 002 in the stacked chips may receive the start information sent by the one or more first dedicated processing units 021, switch from a standby state to a working state based on the start information, and assist the one or more first dedicated processing units 021 in the first chip 001 in executing the data processing task. This can enhance or supplement the computing power of the one or more first dedicated processing units 021, and avoid a case in which the chip cannot complete a data processing task of target data because the computing power of the one or more first dedicated processing units 021 is insufficient. Therefore, a computing requirement of a user is met.

The bus 00 in the first chip 001 is configured to connect the general-purpose processor 011 and the at least one first dedicated processing unit 021.

The memory 031 in the first chip 001 is configured to store the target data and a data processing task corresponding to the target data. A type of the target data may include graphics data, video data, audio data, text data, and the like.

The analog module 041 in the first chip 001 mainly implements an analog processing function, such as radio frequency front-end analog function and a port physical (PHY) layer function.

The input/output module 051 in the first chip 001 is a universal interface of the SoC chip for an external device, and is configured to input and output data. Generally, the input/output module 051 includes a controller and a port physical layer (PHY), for example, a universal serial bus (USB) interface and a mobile industry processor interface (MIPI).

The second dedicated processing unit 012 in the second chip 002 and one or more first dedicated processing units 021 in the at least one first dedicated processing unit 021 have an at least partially same computing function, and may be configured to execute a part or all of the data processing task allocated by the general-purpose processor 011 or by the one or more first dedicated processing units 021. For example, when one of the at least one first dedicated processing unit 021 is an NPU, and a core of the NPU is a unit of a parallel matrix computing array, the second dedicated processing unit 012 may also include a unit configured to implement the parallel matrix computing array, and an algorithm type used by the second dedicated processing unit 012 is also consistent with an algorithm type used by the NPU, for example, Int8, Int6, or F16. However, the second dedicated processing unit 012 and the NPU may have different quantities of arithmetic logic units. In other words, the second dedicated processing unit 012 and the first dedicated processing unit 021 implement a same computing function, but the second dedicated processing unit 012 and the first dedicated processing unit 021 have different computing power.

Optionally, the second dedicated processing unit 012 in the second chip 002 and one or more first dedicated processing units 021 in the at least one first dedicated processing unit 021 have a same computing function. Therefore, the second dedicated processing unit 012 and the one or more first dedicated processing units 021 may process a same data processing task. For example, when the one or more first dedicated processing units 021 execute a data processing task, the second dedicated processing unit 012 may assist the one or more first dedicated processing units 021 in jointly executing the data processing task, to more effectively meet an increasingly high computing requirement of a user.

Optionally, the second dedicated processing unit in the second chip 002 is configured to: switch from a standby state to a working state in response to the start information, and process at least a part of the data processing task based on the computing function. When one or more first dedicated processing units 021 in the first chip 001 execute a data processing task, the second chip 002 in the stacked chip system may receive the start information sent by the one or more first dedicated processing units 021, switch from a standby state to a working state based on the start information, and assist the one or more first dedicated processing units 021 in the first chip 001 in executing the data processing task. This can enhance or supplement computing power of the one or more first dedicated processing units 021, and avoid a case in which the chip cannot complete a task of processing target data because the computing power of the one or more first dedicated processing units 021 is insufficient. Therefore, when the general-purpose processor does not send the start information to the second dedicated processing unit, the second dedicated processing unit is always in the standby state, so that power consumption of the stacked chips is effectively controlled.

In a possible implementation, the second dedicated processing unit 012 includes a corresponding arithmetic logic unit that is in the one or more first dedicated processing units 021 and that has an at least partially same computing function, and the arithmetic logic unit corresponding to the one or more first dedicated processing units 021 is configured to process the target data by using arithmetic logic. For example, when the second dedicated processing unit 012 and the neural network processing unit (NPU) have an at least partially same computing function, because an arithmetic logic unit of the neural network processing unit (NPU) includes: a matrix unit, a vector unit, and a scalar unit, the second dedicated processing unit 012 in the second chip 002 may also include one or more of the matrix unit, the vector unit, and the scalar unit, to execute a data processing task allocated to the second chip 002 to perform matrix multiplication, a vector operation, a scalar operation, and the like on data.

Optionally, the inter-chip interconnection between the first chip 001 and the second chip 002 is a TSV. Because a via diameter of a single through silicon via can be reduced to as small as 10 um by using a TSV process technology, a quantity of TSV interconnections between the first chip 001 and the second chip 002 may be determined based on a requirement without occupying an excessive area. This is not specifically limited in this application.

In a possible implementation, the first chip 001 in FIG. 2B may include a plurality of first dedicated processing units 021. Each first dedicated processing unit 021 may receive a data processing task sent by the general-purpose processor 011, and is configured to process a corresponding type of data processing task. For example, the first chip 001 usually includes a graphics processing unit (GPU), an image signal processor (ISP), a digital signal processor (DSP), a neural network processing unit (NPU), and the like. The graphics processing unit (GPU) and the image signal processor (ISP) may be configured to process graphics data in an intelligent terminal. The digital signal processor (DSP) may be configured to process digital signal data in the intelligent terminal. The neural network processing unit (NPU) may be configured to process massive video and image multimedia data in the intelligent terminal.

In a possible implementation, the second dedicated processing unit 012 in the second chip 002 may include one or more arithmetic logic units, and the one or more arithmetic logic units are configured to separately process data by using corresponding arithmetic logic. For example, when the second dedicated processing unit 012 and the NPU have an at least partially same computing function, because a core arithmetic logic unit of the NPU is a matrix unit, a vector unit, and a scalar unit, the second dedicated processing unit 012 in the second chip 002 may also include one or more of the matrix unit, the vector unit, and the scalar unit, to execute a data processing task allocated to the second chip 002 to perform matrix multiplication, a vector operation, a scalar operation, or the like on data.

It should be noted that, after the general-purpose processor in the first chip generates the data processing task, because the second dedicated processing unit and the one or more first dedicated processing units in the at least one first dedicated processing unit have an at least partially same computing function, the second dedicated processing unit and the one or more first dedicated processing units may process at least a partially same data processing task. Therefore, the data processing apparatus may flexibly allocate data processing tasks to the first dedicated processing unit and the second dedicated processing unit based on a data task requirement, to meet an increasingly high computing requirement of a user. For example, when a data processing task volume is small, the data processing tasks may be allocated to the first dedicated processing unit alone. For another example, when a data processing task volume is large, the data processing tasks may be allocated to both of the first dedicated processing unit and the second dedicated processing unit. Alternatively, the data processing tasks may be allocated to the second dedicated processing unit alone. In addition, the second chip is stacked on the first chip, so that a volume requirement of a product is met without significantly increasing a volume of a chip architecture. In addition, when only one chip executes a data processing task, another chip may be in a low power consumption state, so that power consumption of the stacked chips is effectively controlled when the data processing task is executed. Therefore, the data processing apparatus can meet increasingly high power consumption and computing requirements without increasing a product volume, improve product performance, and meet flexibility of task processing.

Figure 2C:
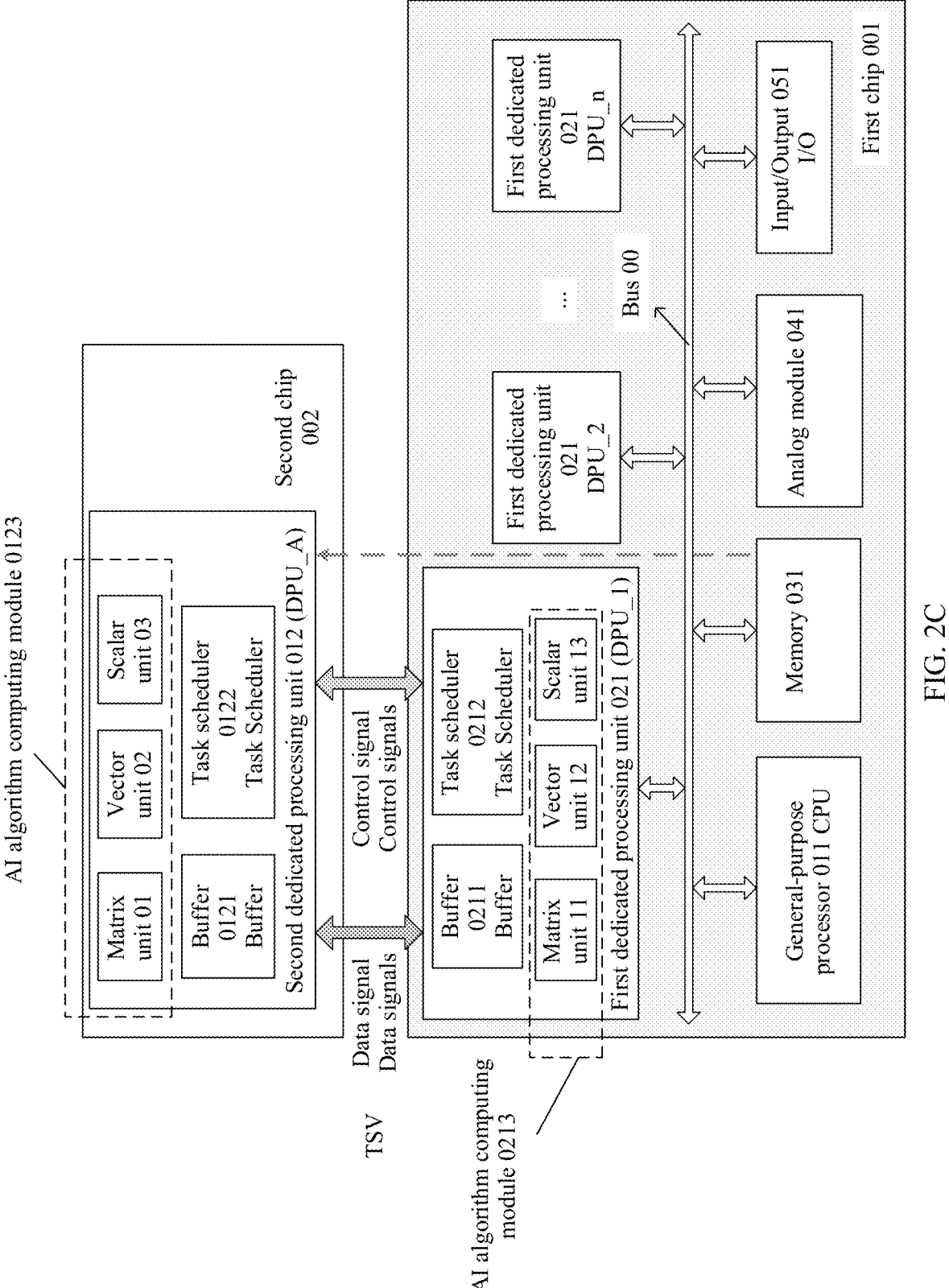
FIG. 2C is a schematic diagram of a stacked-package chip architecture in an actual application according to an embodiment of this application.
Figure 2D:
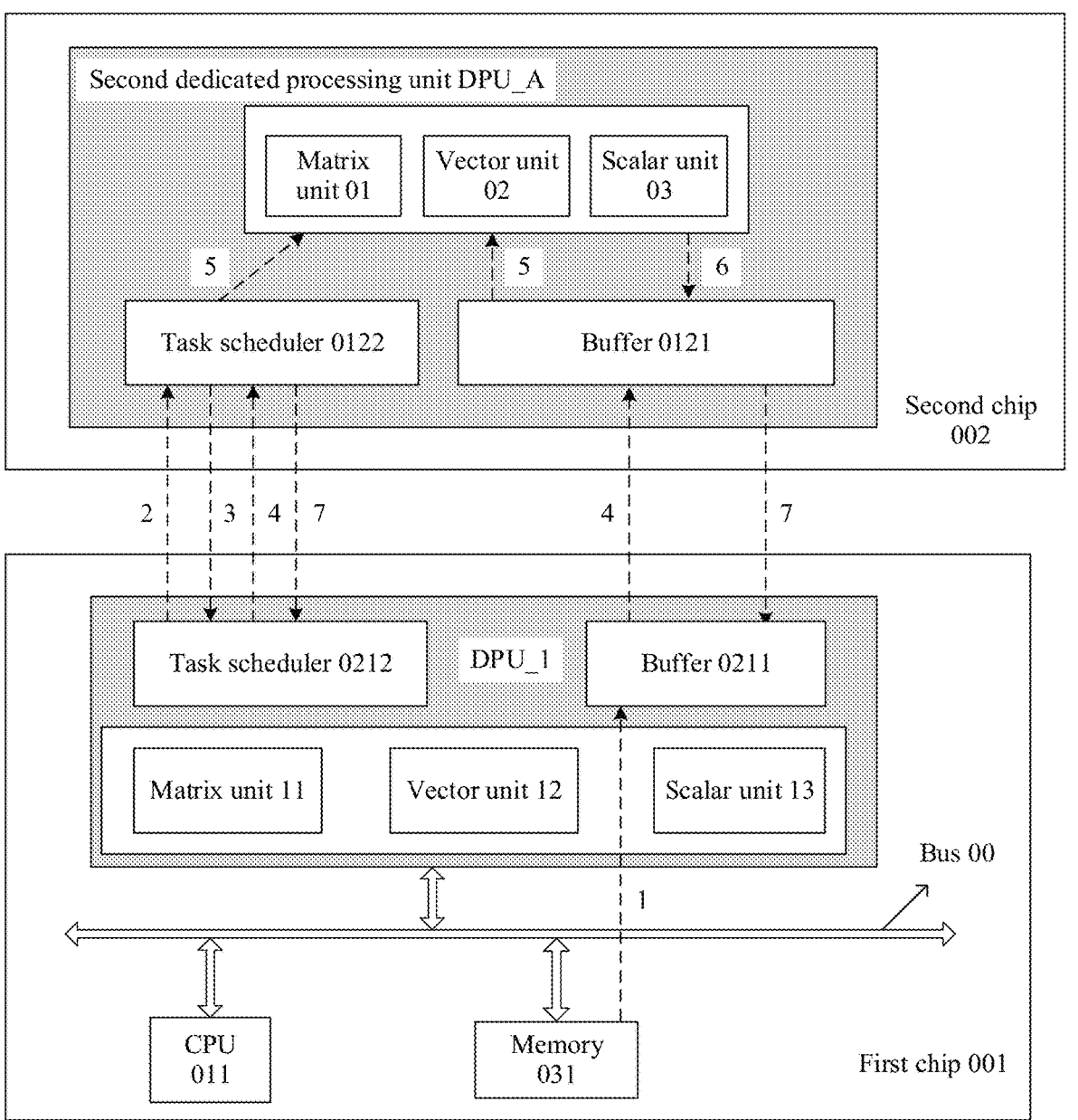
FIG. 2D is a schematic diagram of interaction between a second dedicated processing unit and a first dedicated processing unit in the stacked-package chips shown in FIG. 2C according to an embodiment of this application.

Based on the data processing architecture provided in FIG. 2A and the stacked-package chip architecture provided in FIG. 2B, the following is based on an application scenario in which one or more first dedicated processing units 021 invoke a second dedicated processing unit 012 to enhance computing power when computing power of the one or more first dedicated processing units 021 is insufficient. Refer to FIG. 2C and FIG. 2D. FIG. 2C is a schematic diagram of a stacked-package chip architecture in an actual application according to an embodiment of this application, and FIG. 2D is a schematic diagram of interaction between a second dedicated processing unit and a first dedicated processing unit in the stacked-package chips shown in FIG. 2C according to an embodiment of this application. The stacked-package chip architecture provided in FIG. 2C is configured to support and perform step 1 to step 7 in the following method procedure.

As shown in FIG. 2C, a second dedicated processing unit DPU_A included in a second chip 002 in the stacked-package chip architecture is connected to a first dedicated processing unit DPU_1 through a TSV interconnection. The second dedicated processing unit DPU_A may include a buffer 0121, a task scheduler 0122, and an AI algorithm computing module 0123 whose task sequence and data are directly scheduled by the first dedicated processing unit DPU_1 (the AI algorithm computing module 0123 includes: a matrix unit 01, a vector unit 02, and a scalar unit 03). The buffer 0121 is configured to store data and a corresponding data processing task, the task scheduler 0122 is configured to receive an allocated data processing task, and the AI algorithm computing module 0123 is configured to execute a data processing task. The first dedicated processing unit DPU_1 may also include a buffer 0211 and a task scheduler 0212. For a corresponding function, refer to related descriptions of each functional module of the first dedicated processing unit DPU_1.

Specifically, the DPU_A is directly scheduled by the DPU_1. Therefore, there are at least two types of signals directly interconnected between the two elements through TSV through silicon vias: data signals and control signals. A quantity of bits of the two types of signals depends on a specific design requirement. A quantity of bits of the data signals is a quantity of bits required for parallel computing data, and is generally at least a multiple of 64 bits, such as 64 bits, 128 bits, . . . , and 1028 bits. The control signals generally include single-bit signals such as enable signals, start/stop control signals, and interrupt signals. As shown by a dashed line in FIG. 2D, the DPU_1 first transfers, from the memory 031, data processed in the previous step to the buffer 0211 in the DPU_1 unit, and then determines, based on a computing requirement, whether to send the data to the DPU_A for assisting computing processing.

It should be noted that, for related descriptions of other functional units in the data processing apparatus described in this embodiment of this application, refer to related descriptions of the stacked-package chip architecture provided in FIG. 2B and related descriptions of step 1 to step 7 in the following method procedure. Details are not described herein again.

FIG. 2D is a schematic diagram of interaction between a second dedicated processing unit and a first dedicated processing unit in the stacked-package chips, and the data processing method may include the following steps.

1: After receiving a data processing task issued by a CPU 011 through the task scheduler 0212, the DPU_1 transfers target data from a memory to the temporary buffer 0211 in the DPU_1.

2: The DPU_1 predicts whether computing power of the DPU_1 is sufficient to perform the data processing task by using the task scheduler 0212, and if the computing power of the DPU_1 cannot meet a requirement of the data processing task, the task scheduler 0212 sends start information to the DPU_A through control signals of a TSV.

3: After receiving the start information, the DPU_A is woken up from a low power consumption state and enters a working state, and the DPU_A sends a wait signal to the DPU_1 through the control signals of the TSV.

4: The task scheduler 0212 of the DPU_1 delivers an allocated data processing task to the task scheduler 0122 of the DPU_A, and the DPU_A transfers data that needs to be processed by the DPU_A to the buffer 0121 of the DPU_A.

5: The task scheduler 0122 of the DPU_A starts an AI algorithm computing module 0123 (including a matrix unit 01, a vector unit 02, and a scalar unit 03) based on the data processing task, and the AI algorithm computing module 0123 reads data from the buffer 0121 and starts to process the data.

6: The AI algorithm computing module 0123 stores processed data in the buffer 0121 of the DPU_A.

7. The task scheduler 0122 of the DPU_A sends a processing completion signal to the task scheduler 0212 of the DPU_1 and writes the data from the buffer 0121 of the DPU_A to the buffer 0211 of the DPU_1.

It should be noted that, as a dedicated processing unit for performing AI processing, the DPU_1 generally includes the matrix unit 01, the vector unit 02, and the scalar unit 03 that are parallel, and the like, and further includes the internal temporary buffer 0211 and the task scheduler 0212. The DPU_A is a computing power enhancement unit of the DPU_1. A computing core of the DPU_A includes the matrix unit 01, and may optionally include the vector unit 02, and the scalar unit 03. In addition, the DPU_A may also include the buffer 0121 and the task scheduler 0122 based on a requirement. Although the computing core of the DPU_A may include the matrix unit 01, the vector unit 02, and the scalar unit 03, a quantity of operators or MACs in each unit may be different from that of the DPU_1.

In this embodiment of this application, the DPU A in the second chip 002 is considered as a computing power enhancement module, and is directly scheduled and controlled by the DPU_1 in the first chip 001. In a conventional scenario, computing power of the DPU_1 is sufficient to meet a requirement. In this case, the DPU_A in the second chip 002 may stay in a standby state. Therefore, overall power consumption of the chip system is reduced. When high AI computing power or AI assistance is required in some scenarios such as video recording processing, the DPU_1 can activate the DPU_A through the control signals of the TSV.

It may be understood that, in the following description this application, the scenario in which AI assistance is required to enhance computing power of an arithmetic logic unit is used as an example. The application is not limited to this scenario. Alternatively, another first dedicated processing unit (for example, the DPU_1, . . . , and the DPU_n) may be mounted to the DPU_A to enhance computing power of another dedicated processing unit, for example, enhance computing power of a GPU, an ISP, or the like. This is not specifically limited in this embodiment of this application.

Figure 2E:
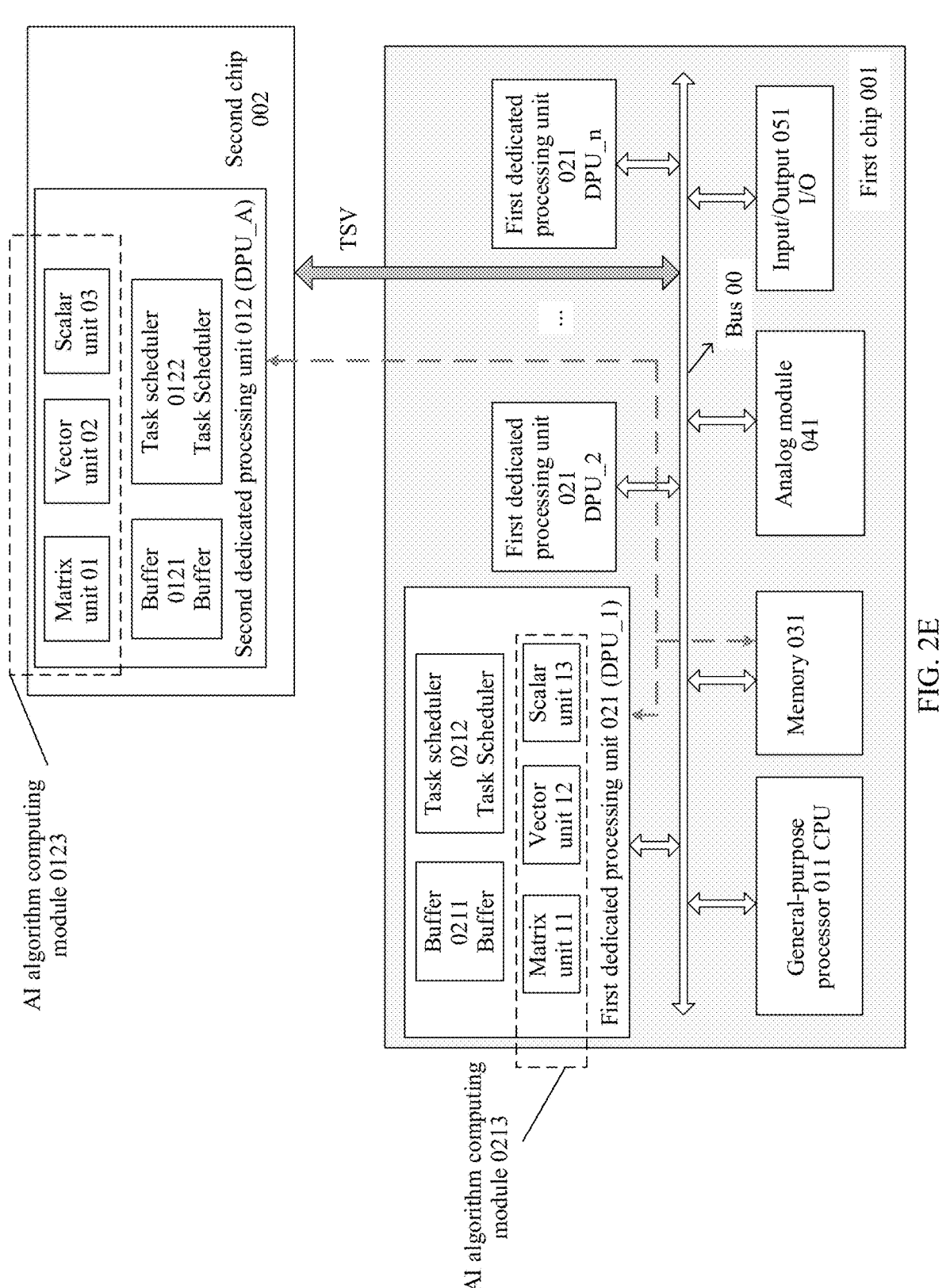
FIG. 2E is a schematic diagram of another stacked-package chip architecture in an actual application according to an embodiment of this application.
Figure 2F:
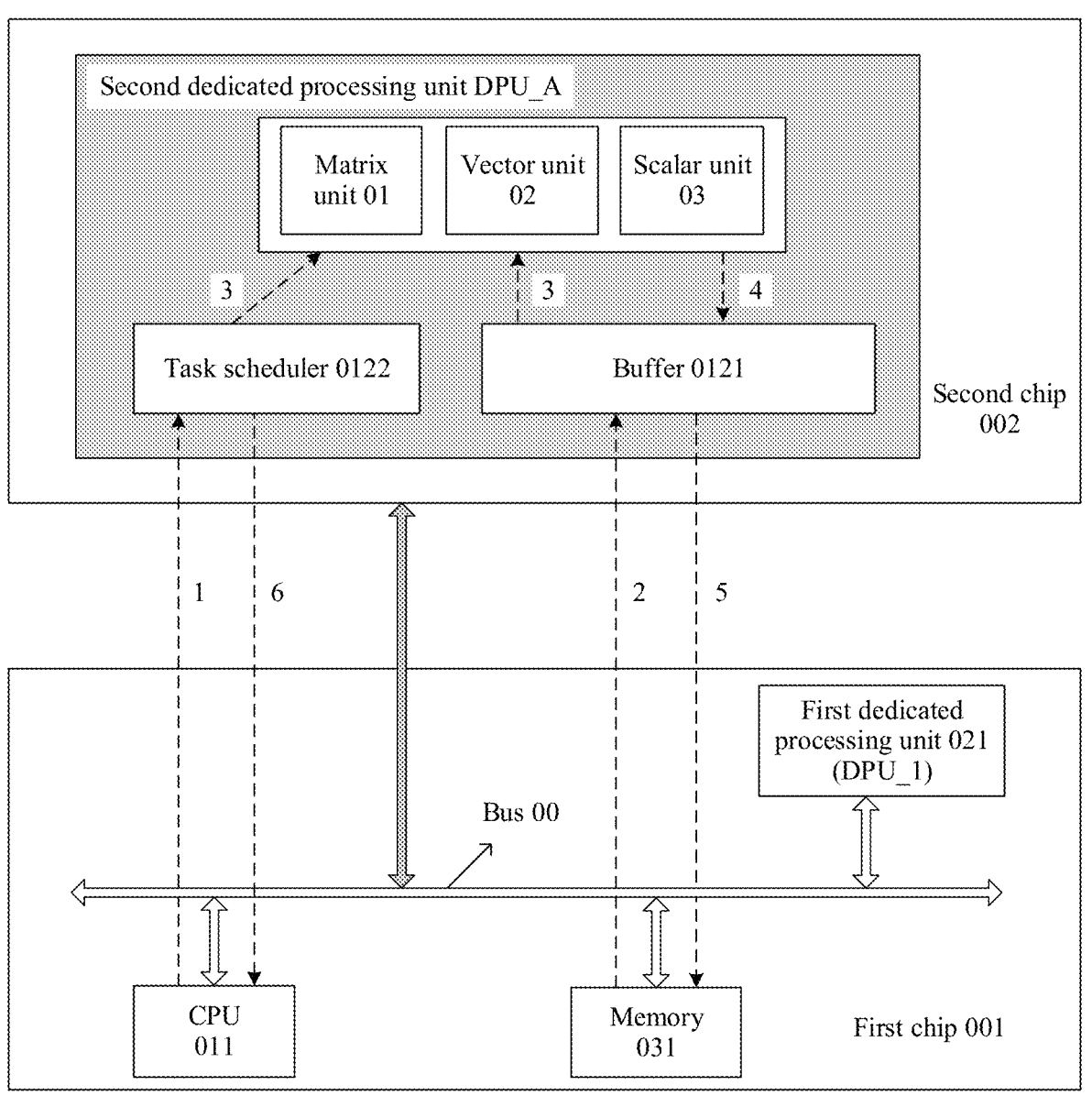
FIG. 2F is a schematic diagram of interaction between a second dedicated processing unit and a first dedicated processing unit in the stacked-package chips shown in FIG. 2E according to an embodiment of this application.

Based on the data processing architecture provided in FIG. 2A and the stacked-package chip architecture provided in FIG. 2B, the following is based on an application scenario in which a general-purpose processor 011 invokes a second dedicated processing unit 012 to perform a computing operation. Refer to FIG. 2E and FIG. 2F. FIG. 2E is a schematic diagram of another stacked-package chip architecture in an actual application according to an embodiment of this application, and FIG. 2F is a schematic diagram of interaction between a second dedicated processing unit and a first dedicated processing unit in the stacked-package chips shown in FIG. 2E according to an embodiment of this application. The stacked-package chip architecture provided in FIG. 2E is configured to support and perform step 1 to step 6 in the following method procedure.

As shown in FIG. 2E, the stacked chip system includes a first chip 001 and a second chip 002, and the second chip 002 in the stacked-package chip architecture is connected to a bus 00 in the first chip 001 through a TSV interconnection. In other words, the inter-chip interconnection is connected between the second dedicated processing unit 012 and the bus 00. A second dedicated processing unit DPU_A may include a buffer 0121 and a task scheduler 0122, and an AI algorithm computing module 0123 whose task sequence and data are directly scheduled by a first dedicated processing unit DPU_1 (the AI algorithm computing module 0123 includes a matrix unit 01, a vector unit 02, and a scalar unit 03). The buffer 0121 is configured to store data and a corresponding data processing task, the task scheduler 0122 is configured to receive an allocated data processing task, and the AI algorithm computing module 0123 is configured to execute a data processing task. The first dedicated processing unit DPU_1 may also include a buffer 0211 and a task scheduler 0212. For a corresponding function, refer to related descriptions of each functional module of the first dedicated processing unit DPU_1.

Specifically, the DPU_A is directly controlled and scheduled by the CPU 011 in the first chip 001, and the DPU_A is directly mounted to the bus 00 in the first chip 001. Therefore, a TSV interconnection between the DPU_A and the first chip 001 generally uses an advanced extensible interface bus (AXI) and an advanced peripheral bus (APB). The AXI bus is configured to read and write a data signal, and the APB bus is configured to control signal configuration.

For functions performed by the other functional units in the data processing apparatus described in this embodiment of this application, refer to the related descriptions of the stacked-package chip architecture provided in FIG. 2B and FIG. 2C and the related descriptions of step 1 to step 6 in the following method procedure. Details are not described herein again.

FIG. 2F is a schematic diagram of interaction between a second dedicated processing unit 012 and a first dedicated processing unit 021 in a stacked-package chip system, and the data processing method includes the following steps.

1. As a general-purpose processor of the first chip 001, the CPU 011 sends start information to ask the DPU_A of the second chip 002 to assist the DPU_1 through the bus 00, and configures at least a part of a data processing task to the task scheduler 0122 of the DPU_A.

2. After receiving the start information, the DPU_A enters a working state from a standby state, that is, wakes up from a low power consumption state; and the task scheduler 0122 of the DPU_A receives the data processing task delivered by the CPU 011 and transfers data from a memory 031 in the chip to the buffer 0121 of the DPU_A through the bus 00.

3. The task scheduler 0122 of the DPU_A starts an AI algorithm computing module 0123 (including a matrix unit 01, a vector unit 02, and a scalar unit 03) based on the data processing task, and the AI algorithm computing module 0123 reads data from the buffer 0121 and starts to process the data.

4. The AI algorithm computing module 0123 stores processed data in the buffer 0121 of the DPU_A.

5. The DPU_A writes the processed data from the buffer 0121 back to the memory 031 in the chip through the bus 00.

6. The task scheduler 0122 of the DPU_A sends a processing completion signal to the CPU 011 of the first chip 001 to complete computing of the data processing task.

Optionally, in this embodiment of this application, the second chip 002 is connected to the bus in the first chip 001 through a TSV interconnection. To be specific, the CPU 011 may control execution of the data processing task of target data in a manner such as by using the DPU_1 alone, by using the DPU_1 and the DPU_A in parallel, or by using the DPU_A alone.

In an embodiment of this application, the second dedicated processing unit DPU_A of the second chip 002 is a computing power enhancement module, and is directly scheduled and controlled by the CPU 011 in the first chip 001. In a conventional scenario, the computing power of the DPU_1 in the first chip 001 is sufficient to meet a requirement. In this case, the DPU_A of the second chip 002 may be kept in a standby state, or only the DPU_A of the second chip 002 is kept in a working state. When high AI computing power is required in some scenarios such as video recording processing, the CPU can activate the DPU_A computing unit through a TSV control signal, so that the DPU_A also participates in high computing power processing.

Figure 2G:
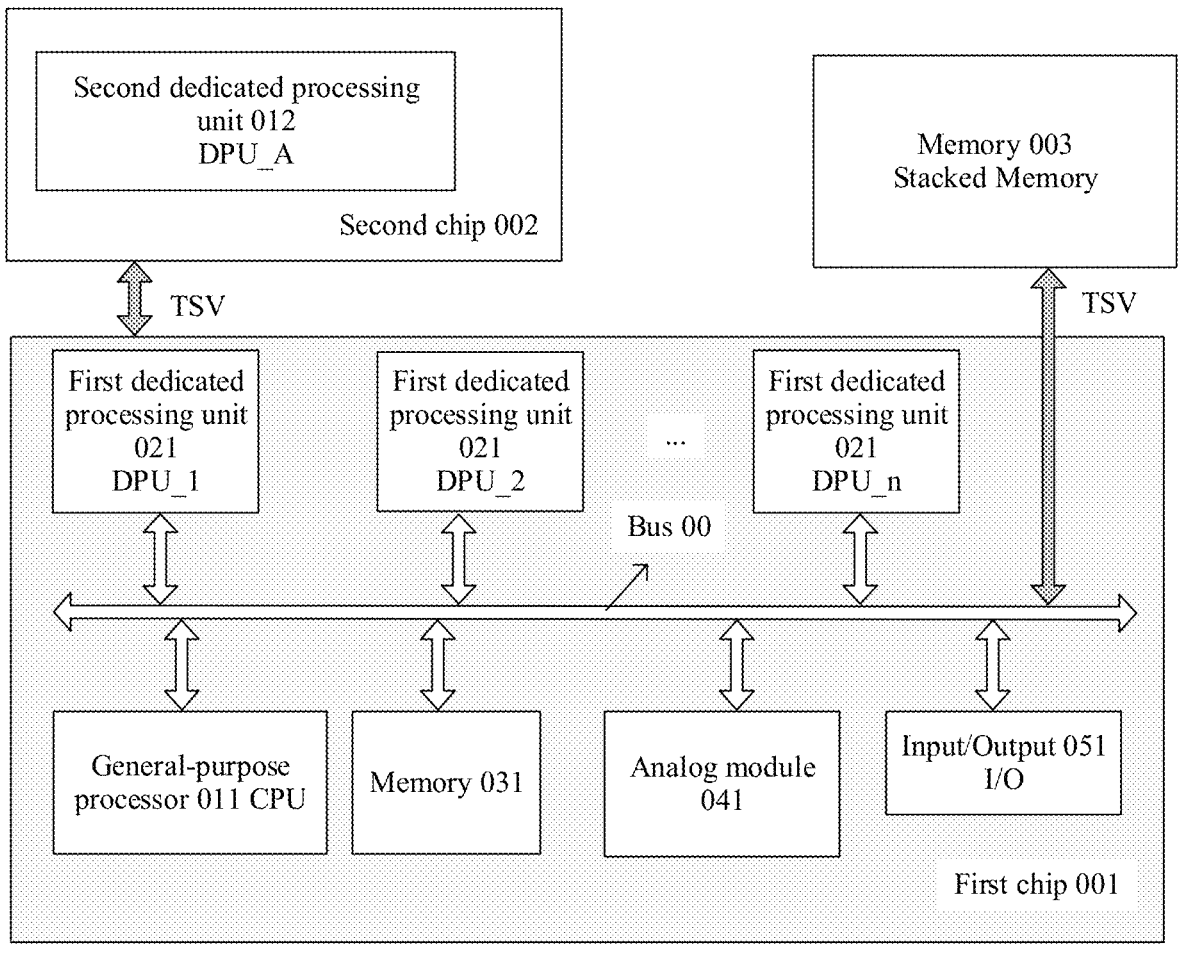
FIG. 2G is a schematic diagram of another stacked-package chip architecture according to an embodiment of this application.

Optionally, based on the data processing architecture provided in FIG. 2A and the stacked-package chip architecture provided in FIG. 2B, the first chip may further be stacked-packaged with a plurality of second chips into a chip system. A second dedicated processing unit included in each of the plurality of second chips and one or more first dedicated processing units in the at least one first dedicated processing unit may have a same or a partially same computing function. For another example, the first chip may also be separately stacked-packaged with a second chip and a third chip. The third chip includes one or more of a memory, a power transmission circuit module, an input/output circuit module, or an analog module. FIG. 2G is a schematic diagram of another stacked-package chip architecture according to an embodiment of this application. As shown in FIG. 2G, in addition that computing power units can be stacked in the architecture, a stacked memory 003 may be further stacked, so that the stacked memory 003 is close to an architecture logic unit. Therefore, data processing bandwidth and efficiency of an entire system is improved, and a problem of insufficient memory bandwidth of stacked chips is resolved. Optionally, one or more of a power transmission circuit module, an input/output circuit module, or an analog module may be stacked, to separate and decouple an analog function and a logical computing function of a chip. Therefore, an increasingly high performance for the chip in chip evolution and service scenarios can be achieved.

It should be noted that the stacked-package chips in FIG. 2C and FIG. 2E are merely examples of an implementation in this application, and the stacked-package chip architecture in this application includes but is not limited to the foregoing stacked-package chip architecture.

It should be further noted that the stacked-package chips may be configured in different data processing apparatuses, and correspond to different forms of main control in the different data processing apparatuses. A form of the main control is not limited in this embodiment of this application, for example, a server notebook computer, a smartphone, or a vehicle-mounted television.

Figure 3:
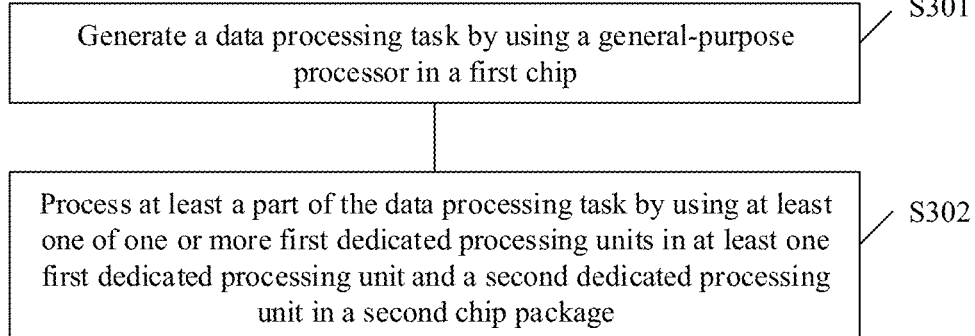
FIG. 3 is a schematic flowchart of a data processing method according to an embodiment of this application.

FIG. 3 is a schematic flowchart of a data processing method according to an embodiment of this application. The method may be applied to a structure of the data processing apparatus in FIG. 2A and the stacked-package chip architecture provided in FIG. 2B. The data processing apparatus may include the stacked-package chip architecture provided in FIG. 2B, and is configured to support and perform step S301 and step S302 in the method procedure shown in FIG. 3.

Step S301: Generate a data processing task by using a general-purpose processor in a first chip. Specifically, the data processing apparatus generates the data processing task by using the general-purpose processor. The first chip includes the general-purpose processor, a bus, and at least one first dedicated processing unit DPU, the general-purpose processor and the at least one first dedicated processing unit are connected to the bus, and the first chip and the second chip are stacked-packaged into a chip system.

Optionally, the general-purpose processor includes a central processing unit (CPU).

Optionally, each of the one or more first dedicated processing units and the second dedicated processing unit includes at least one of a graphics processing unit (GPU), an image signal processor (ISP), a digital signal processor (DSP), or a neural network processing unit (NPU). For example, the graphics processing unit (GPU) may be configured to process graphics data in an intelligent terminal. The digital signal processor (DSP) may be configured to process digital signal data in the intelligent terminal. The neural network processing unit (NPU) may be configured to process massive video and image multimedia data in the intelligent terminal. Therefore, the at least one first dedicated processing unit (DPU) may be configured to execute data processing tasks of different data types, so that the intelligent terminal can adapt to more data processing requirements of a user.

Step S302: Process at least a part of the data processing task by using at least one of one or more first dedicated processing units in the at least one first dedicated processing unit and a second dedicated processing unit in a second chip package. Specifically, the data processing apparatus processes at least a part of the data processing task by using at least one of one or more first dedicated processing units in the at least one first dedicated processing unit and the second dedicated processing unit in the second chip package. The second dedicated processing unit and the one or more first dedicated processing units in the at least one first dedicated processing unit have a same computing function. The first chip and the second chip are stacked-packaged, and are connected to each other through an inter-chip interconnection.

Optionally, the processing at least a part of the data processing task by using at least one of one or more first dedicated processing units in the at least one first dedicated processing unit and a second dedicated processing unit in a second chip package includes: sending, by using the general-purpose processor, start information to the second dedicated processing unit through the inter-chip interconnection; and switching, by using the second dedicated processing unit in response to the start information, from a standby state to a working state, and processing the at least a part of the data processing task based on the computing function.

Optionally, the sending of the start information to the second dedicated processing unit by using the general-purpose processor through the inter-chip interconnection includes: when computing power of the one or more first dedicated processing units does not meet a requirement, sending, by using the general-purpose processor, the start information to the second dedicated processing unit through the inter-chip interconnection.

Optionally, the processing of at least a part of the data processing task by using at least one of one or more first dedicated processing units in the at least one first dedicated processing unit and a second dedicated processing unit in a second chip package includes: sending, by using the one or more first dedicated processing units, start information to the second dedicated processing unit through the inter-chip interconnection; and the second dedicated processing unit is configured to: switch from a standby state to a working state in response to the start information, and process at least a part of the data processing task based on the computing function.

Optionally, the sending of the start information to the second dedicated processing unit by using the one or more first dedicated processing units through the inter-chip interconnection includes: when computing power of the one or more first dedicated processing units does not meet a requirement, sending, by using the one or more first dedicated processing units, the start information to the second dedicated processing unit through the inter-chip interconnection.

It should be noted that for related descriptions of step S301 and step S302 in this embodiment of this application, refer to related descriptions in the foregoing embodiments in FIG. 2A to FIG. 2G. Details are not described herein again.

In an implementation of some embodiments of this application, the stacked chip architecture in the data processing apparatus may flexibly allocate data processing tasks to the first dedicated processing unit and the second dedicated processing unit. When the first dedicated processing unit processes a data processing task alone, the second processing unit in the stacked second chip is in a standby state, and the second dedicated processing unit switches from a standby state to a working state only when receiving the start information. Because the power consumption of the second processing unit being in the standby state is lower than being in the working state, overall power consumption control of the stacked chip architecture is more flexible and efficient, and energy efficiency of the chip system is improved. In addition, in the stacked chip architecture, the second dedicated processing unit may assist the first dedicated processing unit in processing a data processing task without increasing an overall volume, to enhance computing power of the first dedicated processing unit. This greatly alleviates and meets a requirement of enhancing chip computing power due to rapid development of current algorithms, and avoids the scenario in which a chip cannot complete a task of processing target data because the computing power of the first dedicated processing unit is insufficient. Further, when the Moore's Law growth rate slows down and an size of a terminal chip is limited, computing power may be stacked in a vertical direction (that is, stacking the first chip and the second chip) in the computing power stacked chip architecture, so that the increasingly high requirement for computing power in chip evolution and a service scenario can continue.

It should be noted that, for brief description, the foregoing method embodiments are represented as a series of actions. However, a person skilled in the art should appreciate that this application is not limited to the described order of the actions, because according to this application, some steps may be performed in other orders or simultaneously. In addition, a person skilled in the art should also appreciate that embodiments described in this specification all belong to example embodiments, and the involved actions and modules are not necessarily required by this application.

In several embodiments provided in this application, it should be understood that the disclosed apparatuses may be implemented in other manners. For example, the described apparatus embodiment is merely an example. For example, division into the units is merely logical function division and may be other division in an actual implementation. For example, a plurality of units or components may be combined or integrated into another system, or some features may be ignored or not performed. In addition, the displayed or discussed mutual connections or communication connections may be communication connections between apparatuses or units connected by using some conducting wires, conductors, or interfaces, or may be in electronic or other forms.

The foregoing units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, function units in embodiments of this application may be integrated into one processing unit, or each of the units may exist alone physically, or two or more units are integrated into one unit. The integrated unit may be implemented in a form of hardware, or may be implemented in a form of a software functional unit.

The foregoing embodiments are merely intended for describing the technical solutions of this application, but not for limiting this application. Although this application is described in detail with reference to the foregoing embodiments, a person of ordinary skill in the art should understand that they may still make modifications to the technical solutions described in the foregoing embodiments or make equivalent replacements to some technical features thereof, without departing from the spirit and scope of the technical solutions of embodiments of this application.

What is claimed is:

1. A data processing apparatus, comprising a first chip and a second chip that are stacked-packaged, wherein the first chip comprises a general-purpose processor, a bus, and at least one first dedicated processing unit, the general-purpose processor and the at least one first dedicated processing unit are connected to the bus, and the general-purpose processor is configured to generate a data processing task; and the second chip comprises a second dedicated processing unit, the second dedicated processing unit and one or more first dedicated processing units in the at least one first dedicated processing unit are configured with an at least partially same computing function, and at least one of the one or more first dedicated processing units and the second dedicated processing unit can process at least a part of the data processing task based on the partially same computing function, wherein the first chip and the second chip are connected to each other through an inter-chip interconnection and share computing power by using arithmetic logic, arithmetic manners, or arithmetic objectives that are partially same;

wherein the general-purpose processor is configured to send start information and data related to the data processing task to the second dedicated processing unit through the inter-chip interconnection, and wherein the second dedicated processing unit is configured to switch from a standby state to a working state in response to the start information.

2. The apparatus according to claim 1, wherein the second dedicated processing unit and the one or more first dedicated processing units in the at least one first dedicated processing unit are configured with a same computing function.

3. The apparatus according to claim 1, wherein the general-purpose processor comprises a central processing unit (CPU).

4. The apparatus according to claim 1, wherein the one or more first dedicated processing units comprise at least two selected from a graphics processing unit (GPU), an image signal processor (ISP), a digital signal processor (DSP), or a neural network processing unit (NPU).

5. The apparatus according to claim 1, wherein the inter-chip interconnection comprises at least one of a through silicon via (TSV) interconnection or a wire bonding interconnection.

6. The apparatus according to claim 1, wherein the apparatus further comprises a third chip, the third chip is stacked-packaged with the first chip and the second chip, and the third chip is connected to at least one of the first chip and the second chip through the inter-chip interconnection; and the third chip comprises at least one of a memory, a power transmission circuit module, an input/output circuit module, or an analog module.

7. The apparatus according to claim 1, wherein the inter-chip interconnection is connected between the one or more first dedicated processing units and the second dedicated processing unit, and the second dedicated processing unit is configured to obtain at least a part of the data processing task from the one or more first dedicated processing units.

8. The apparatus according to claim 1, wherein the inter-chip interconnection is connected between the second dedicated processing unit and the bus, and the second dedicated processing unit is configured to obtain at least a part of the data processing task from the general-purpose processor through the bus.

9. The apparatus according to claim 1, wherein the second dedicated processing unit is configured to: process at least a part of the data processing task based on the computing function and the data related to the data processing task that is received through the inter-chip interconnection.

10. The apparatus according to claim 9, wherein the general-purpose processor is configured to: when computing power of the one or more first dedicated processing units does not meet a requirement, send the start information to the second dedicated processing unit through the inter-chip interconnection.

11. The apparatus according to claim 1, wherein the one or more first dedicated processing units are configured to send start information to the second dedicated processing unit through the inter-chip interconnection; and the second dedicated processing unit is configured to: process at least a part of the data processing task based on the computing function and the data related to the data processing task that is received through the inter-chip interconnection.

12. The apparatus according to claim 11, wherein the one or more first dedicated processing units are configured to: when computing power of the one or more first dedicated processing units does not meet a requirement, send the start information to the second dedicated processing unit through the inter-chip interconnection.

13. The data processing apparatus of claim 1, wherein the second dedicated processing unit includes an artificial intelligence (AI) algorithm computing module whose task sequence and data are scheduled by the at least one first dedicated processing unit.

14. The data processing apparatus of claim 1, further comprising an analog module.

15. The data processing apparatus of claim 14, wherein the analog module is configured with a radio frequency front-end analog function or a port physical layer function.

16. A data processing method, comprising:

generating a data processing task by using a general-purpose processor in a first chip, wherein the first chip comprises the general-purpose processor, a bus, and at least one first dedicated processing unit (DPU), and the general-purpose processor and the at least one first dedicated processing unit are connected to the bus;

processing at least a part of the data processing task by using at least one of one or more first dedicated processing units in the at least one first dedicated processing unit or a second dedicated processing unit in a second chip package, wherein the second dedicated processing unit and the one or more first dedicated processing units in the at least one first dedicated processing unit are configured with an at least partially same computing function, and the first chip and the second chip are stacked-packaged, are connected to each other through an inter-chip interconnection, and share computing power by using arithmetic logic, arithmetic manners, or arithmetic objectives that are partially same; and sending start information and data related to the data processing task to the second dedicated processing unit through the inter-chip interconnection when computing power of the one or more first dedicated processing units does not meet a requirement; and switching the second dedicated processing unit from a standby state to a working state.

17. The data processing method of claim 16, wherein when the second dedicated processing unit is in a standby state and the data processing task is processed by at least one of the one or more first dedicated processing units in the at least one first dedicated processing unit.

18. The data processing method of claim 16, further comprising: after switching the second dedicated processing unit from the standby state to the working state, assisting, by the second dedicated processing unit, the one or more first dedicated processing unit in executing the data processing task based on the data related to data processing task that is received through the inter-chip connection by the second dedicated processing unit.

19. The data processing method of claim 16, wherein the second dedicated processing unit comprises an artificial intelligence (AI) algorithm computing module whose task sequence and data are scheduled by the at least one first dedicated processing unit.

* * * * *